UNITED STATES PATENT OFFICE.

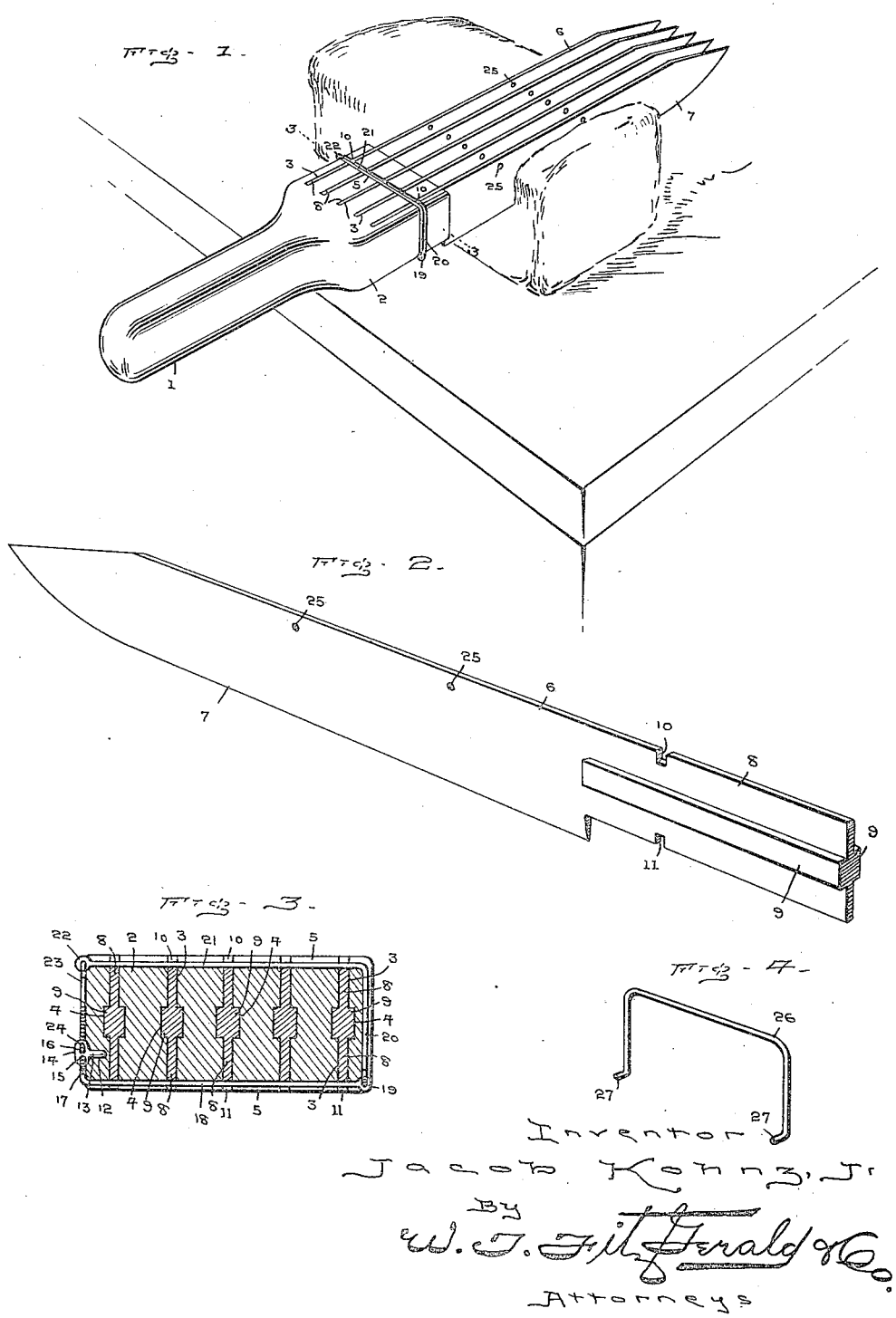

JACOB KOHNZ, JR., OF FULTS, ILLINOIS.

BREAD AND MEAT SLICER.

1,278,682. Specification of Letters Patent. Patented Sept. 10, 1918.

Application filed May 17, 1917. Serial No. 169,293.

*To all whom it may concern:*

Be it known that I, JACOB KOHNZ, Jr., a citizen of the United States, residing at Fults, in the county of Monroe and State of Illinois, have invented certain new and useful Improvements in Bread and Meat Slicers; and I do hereby declare the following to be a full, clear, and exact description of the invention, such as will enable others skilled in the art to which it appertains to make and use the same.

My invention relates to a new and improved bread and meat slicer, and is more particularly adapted for slicing bread, meat and the like, and has for one of its objects the provision of a device whereby bread and the like may be sliced in any desired number of slices of any desired thickness in one operation.

Another object of this invention is to provide a device having a plurality of detachable blades provided with means for preventing lateral and vertical displacement of the blades with respect to the handle provided therefor.

Another object of this invention is to provide the device with a novel form of securing member, whereby the blades may be secured within the handle or removed therefrom in a ready and efficient manner.

Another object of this invention is to provide a slicer for bread, meat and the like, which is simple in construction, efficient and durable, and which can be manufactured and sold upon the market at a nominal cost.

These and other objects and advantages will more fully appear as the nature of the invention is more clearly understood from the following description and the accompanying drawings wherein I have disclosed one preferred embodiment of my invention, it being understood that numerous variations and modifications may be made in the form, construction and arrangement of the parts without departing from the spirit of the invention or exceeding the scope of the appended claims.

In the drawings:

Figure 1 is a perspective view of the device, showing the same in the act of cutting an article upon a suitable support.

Fig. 2 is a perspective view of one of the knife blades.

Fig. 3 is a transverse sectional view, on line 3—3 of Fig. 1, showing the detail manner of mounting the knife blades upon the handle.

Fig. 4 is a perspective view of the device for withdrawing and replacing the knives.

I desire to here state that I have for the sake of clearness and purpose of illustration shown a slicing device comprising five cutting blades, but that I am not limited to this exact number as any desired number of blades may be employed.

Referring to the drawings wherein similar reference characters denote corresponding parts through the several views, 1 denotes the handle, provided at one end with the enlarged and widened head 2 preferably rectangular in cross section. Within the head 2 are formed the plurality of longitudinal slots 3 which extend entirely through the head from top to bottom and within the side walls of the slots 3 are formed the oppositely disposed and longitudinally extending grooves or channels 4 which are located substantially centrally between the top and bottom of the head 2. Formed in the outer surfaces of the head 2 at any suitable point is the annular groove or channel 5, the channel 5 intersecting the upper and lower portions of the slots 3 and at right angles thereto.

The knife blades are indicated by the numeral 6 and are preferably formed in the shape of a butcher knife and provided with the sharp cutting edge 7. The knives 6 are provided with the shanks 8 having formed upon each of their sides the longitudinally extending ribs 9 preferably positioned at points midway between the upper and lower edges of the shanks 8, and formed in the upper and lower edges of the shanks 8 are the upper and lower transverse notches 10 and 11, the notches 10 and 11 being located at a sufficient distance from the butt ends of the shanks 8 of the knives 6 to cause the notches 10 and 11 to register with the annular groove 5 of the head 2 when the shanks 8 are projected into the slots 3 of the head 2 with the ribs 9 of the shanks 8 snugly seated within the channnels 4 of the slots 3 of the head, the channels 4 and the ribs 9 being, of course, of corresponding dimensions.

Formed in one side of the head 2 in proximity to its bottom is the socket 12 into which is projected the pin 13 having the head 14 provided with the eyes 15 and 16 in juxtaposition to each other. Suitably secured within the eye 15 of the pin 13 is the short stem 17 of the L-shaped rod or band 18, pivotally connected at 19 with the short stem 20 of the L-shaped rod 21, which in turn is pivotally connected at 22 with the link 23 provided with the hook 24 adapted to be projected through the eye 16 of the pin 13. This constitutes a securing member for retaining the shanks 8 of the knives 6 in operative position within the head 2 of the handle 1, as the members of the securing device are snugly seated within the annular channel 5 of the head 2 and the respective slots 10 and 11 of the shanks 8 of the knives 6 and when secured upon the head 2 of the handle 1 in the manner clearly shown in Fig. 3 of the drawings. For conveniently withdrawing the knives 6 from within the head 2, I preferably form in the upper edges of the knives 6 any desired number of apertures 25 adapted to receive the hook ends or angle members 27 of a tool 26 formed of a piece of wire or the like.

From the foregoing it will be seen that I am enabled to produce a slicing device which possesses many advantageous features over the slicing devices now upon the market, in that I employ a plurality of transversely alined and equispaced knives so mounted within a specifically constructed head that vertical movement of the knives in either direction with respect to the head and the handle thereof is impossible by the provision of the ribs 9 upon the shanks 8 of the knives 6, which ribs are snugly seated within the channels 4 of the slots 3 formed in the head 2 when the knives are inserted therein, the knives 6 being prevented from longitudinal movement within the slots 3 by the securing member within the annular channel 5 of the head 2 being snugly seated within the notches 10 and 11 of the shanks of the knives 6.

Another feature of my invention is that any desired knife or number of knives may be withdrawn from the head 2 so as to cut any desired number of slices at one operation and of any desired width or thickness, the removal of the knives being readily accomplished by removing the hook 24 from within the eye 16 of the pin 13 and swinging the respective members of the securing device outwardly and around the head 2 until all of the parts have been removed from within the channel 5 of the head 2 and the respective notches 10 and 11 of the shanks 8 of the knives 6, whereby any knife or desired number of knives may be readily removed either by the hand or by the insertion of a tool or the like in either of the apertures 25 of the knives 6 and drawing the knives longitudinally from within the slots 3 and the channels 4 of the head 2 and thereafter replacing the parts of the securing member within the channel 5 of the head 2 and the slots 10 and 11 of the knives remaining within the head and subsequently securing the hook 24 within the eye 16 of the pin 13.

While I have shown the parts of the securing member consisting of rods and the annular groove or channel 5 of sufficient width for snugly receiving the rods of the securing member, I may employ bands of any suitable width in lieu of the rods and correspondingly form the groove or channel 5 of the head 2 for snugly receiving the bands of the securing member.

Having described my invention, what I claim as new and desire to secure by Letters Patent, is:—

1. In a device of the character specified, the combination of a handle, a head upon said handle having a plurality of longitudinal slots therein provided with opposing channels in their side walls, and a plurality of knives having ribs upon their shanks for operatively engaging the slots and channels of said head; with means for operatively maintaining the shanks of said knives within the slots of said head.

2. A knife, comprising a handle having a head substantially rectangular in cross section and provided with a plurality of longitudinal slots extending inwardly from its end and extending therethrough from its top to its bottom to provide a plurality of clamping arms, said head also provided with oppositely disposed longitudinal channels in the side walls of said slots and an outer transversely surrounding groove crossing said slots at right angles thereto, a plurality of removable knife blades having shanks for entering said slots and provided with means for coöperatively engaging said channels, said shanks having notches in their upper and lower edges for coöperatively registering with said surrounding groove, and removable means seated in said surrounding groove and said notches of said shanks for removably but rigidly clamping said knife blades upon said head.

3. A knife, comprising a handle having a head provided with a plurality of longitudinal slots extending inwardly from its end and vertically therethrough and provided with oppositely disposed longitudinal channels in the side walls of said slots, said head also provided with an annular groove crossing said slots at right angles thereto, a plurality of removable knife blades having shanks provided with longitudinal ribs upon both of their sides for coöperatively engaging said slots and said channels, said shanks also having notches in their upper and lower edges for coöperatively registering with said annular groove, and removable means seated in said annular groove and said registering notches of said shanks for removably but rigidly securing said knife blades upon said head.

4. A knife, comprising a handle having a head provided with a plurality of longitudinal slots extending inwardly from its end and vertically therethrough and provided with oppositely disposed longitudinal channels in the side walls of said slots, said head also provided with an annular groove crossing said slots at right angles thereto, a plurality of removable knife blades having shanks provided with longitudinal ribs upon both of their sides for coöperatively engaging said slots and said channels, said shanks also having notches in their upper and lower edges for coöperatively registering with said annular groove, and a removable clamping member having one end secured to a securing member upon a side of said head and having means upon its opposite end for engaging said securing member for surrounding said head and seating in said annular groove and said registering notches of said shanks for removably but rigidly securing said knife blades upon said head.

5. A knife, comprising a handle having a head provided with a plurality of longitudinal slots extending inwardly from its end and vertically therethrough and provided with oppositely disposed longitudinal channels in the side walls of said slots, said head also provided with an annular groove crossing said slots at right angles thereto, a plurality of removable knife blades having shanks equal in width to the width of said slots and provided with longitudinal ribs upon both of their sides for coöperatively engaging said slots and said channels for preventing lateral movement of said blades relative to said head, said shanks also having notches in their upper and lower edges of a depth equal to the depth of said groove for coöperatively registering with said annular groove for preventing longitudinal movement of said blades relative to said head, and a removable linked clamping band having one end secured to an eye-screw secured in a side of said head and having a hook upon its opposite end for engaging said eye-screw for surrounding said head and seating in said annular groove and said notches of said shanks for removably but rigidly securing said knife blades upon said head.

In testimony whereof I have signed my name to this specification in the presence of two subscribing witnesses.

JACOB KOHNZ, Jr.

Witnesses:
  CHAS. MAEYS,
  JOHN HEUERFOUTT.

Copies of this patent may be obtained for five cents each, by addressing the "Commissioner of Patents, Washington, D. C."